United States Patent
Zhang (10) Patent No.: US 9,611,832 B2
(45) Date of Patent: Apr. 4, 2017

(54) WATER FLOW POWER GENERATION APPARATUS

(75) Inventor: Qun Zhang, Shandong (CN)

(73) Assignee: SHANDONG BOXING YUANDAO ENERGY TECHNOLOGY CO., LTD., Shandong (CN)

(*) Notice: Subject to any disclaimer, the term of this patent is extended or adjusted under 35 U.S.C. 154(b) by 800 days.

(21) Appl. No.: 14/008,871

(22) PCT Filed: Mar. 13, 2012

(86) PCT No.: PCT/CN2012/072247
§ 371 (c)(1),
(2), (4) Date: Feb. 12, 2014

(87) PCT Pub. No.: WO2012/130037
PCT Pub. Date: Oct. 4, 2012

(65) Prior Publication Data
US 2014/0178177 A1    Jun. 26, 2014

(30) Foreign Application Priority Data

Mar. 30, 2011 (CN) .......................... 2011 1 0078623
Apr. 14, 2011 (CN) .......................... 2011 1 0092876
(Continued)

(51) Int. Cl.
*F01D 1/24* (2006.01)
*F03B 13/26* (2006.01)
*F03B 17/06* (2006.01)

(52) U.S. Cl.
CPC .......... *F03B 13/264* (2013.01); *F03B 17/063* (2013.01); *F05B 2240/13* (2013.01);
(Continued)

(58) Field of Classification Search
CPC .. F03B 13/264; F03B 17/063; F05B 2240/13; F05B 2240/93; Y02E 10/28; Y02P 70/527
See application file for complete search history.

(56) References Cited

U.S. PATENT DOCUMENTS 4,084,918 A * 4/1978 Pavlecka .................. F03D 1/04
                                                              290/55
4,279,569 A * 7/1981 Harloff ..................... F01D 1/14
                                                             415/148
(Continued)

FOREIGN PATENT DOCUMENTS

CN               1055039          10/1991
CN            101223319           7/2008
(Continued)

OTHER PUBLICATIONS

International Search Report for PCT/CN2012/072247 mailed May 17, 2012.

*Primary Examiner* — Igor Kershteyn
(74) *Attorney, Agent, or Firm* — Nixon & Vanderhye P.C.

(57) ABSTRACT

Water flow power generation apparatus, includes an upper bracket and a lower bracket. The transmission and the generator are located above the upper bracket, there are at least two reverse direction rotating water wheels fixed between the upper bracket and the lower bracket. Every vane of one wheel extends into the space between two adjacent wanes of the other wheel, and the same end of each water wheel is fixed with some synchromesh gears, respectively. A sharp-angled shape guide object is fixed at the water inlet end of the water wheels between the upper bracket and the lower bracket. The resulting structure can not only improve the utilization ratio of water power, but also improve the generating efficiency; moreover, the whole generating appa-
(Continued)

ratus is of simple structure, low cost for design and manufacture and easy installation, and applicable to various water flows.

17 Claims, 6 Drawing Sheets

(30) Foreign Application Priority Data

Mar. 7, 2012 (CN) .......................... 2012 2 0082175
Mar. 7, 2012 (CN) .......................... 2012 2 0082345

(52) U.S. Cl.
CPC ........... *F05B 2240/93* (2013.01); *Y02E 10/28* (2013.01); *Y02P 70/527* (2015.11)

(56) References Cited

U.S. PATENT DOCUMENTS

| | | | | |
|---|---|---|---|---|
| 5,332,354 A * | 7/1994 | Lamont | ............... | F03D 3/0463 415/2.1 |
| 5,451,138 A * | 9/1995 | Istorik | ............... | F03B 3/00 415/182.1 |
| 6,158,953 A * | 12/2000 | Lamont | ............... | B64C 11/007 415/125 |
| 6,849,964 B2 * | 2/2005 | Becherucci | ............... | F03D 3/0418 290/42 |
| 6,981,839 B2 * | 1/2006 | Fan | ............... | F03D 3/002 290/55 |
| 7,112,034 B2 * | 9/2006 | Bezemer | ............... | F03D 3/04 415/3.1 |
| 7,521,816 B2 * | 4/2009 | Helfrich | ............... | F03B 13/264 290/43 |
| 7,605,490 B2 * | 10/2009 | Srybnik | ............... | F03B 1/02 290/52 |
| 2009/0212572 A1 * | 8/2009 | Sundermann | ............... | F03B 17/067 290/54 |

FOREIGN PATENT DOCUMENTS

| | | |
|---|---|---|
| CN | 101275534 | 10/2008 |
| CN | 102182609 | 9/2011 |
| JP | 60192801 | 10/1985 |
| JP | 2010031793 | 2/2010 |

* cited by examiner

WATER FLOW POWER GENERATION APPARATUS

This application is the U.S. national phase of International Application No. PCT/CN2012/072247 filed 13 Mar. 2012 which designated the U.S. and claims priority to CN 201110078623.7 filed 30 Mar. 2011, CN 201110092876.X filed 14 Apr. 2011, CN 201220082175.8 filed 7 Mar. 2012, and CN 201220082345.2 filed 7 Mar. 2012, the entire contents of each of which are hereby incorporated by reference.

TECHNICAL FIELD

This present invention relates to power generation apparatus, especially water flow power generation apparatus.

BACKGROUND TECHNOLOGY

Green energy is a project that all countries of the world concern and develop commonly; and water power is one of the important inexhaustible and bottomless reproducible green energy of no pollution. There are abundant water power resources in the world, so making use of water to generate power has become a major trend of energy development strategy for each country in the world. The traditional methods of hydro-power generation include: dam type hydropower station, diversion hydropower station and dam-diversion type hydroelectric power station. These methods are all required to construct dams for impoundment, with large investment but slow effect, and even lead to a large scale of immigration, which are the shortcomings of the prior technology.

DETAILED DESCRIPTION OF THE INVENTION

To solve the shortage of prior art, this invention provides a water flow power generation apparatus applicable for rivers, ocean currents, tide, flat water and vertical flow, with no need of dam construction for impoundment, as well as few investment and rapid effect. This apparatus can make use of water flow to generate power effectively with high efficiency.

This invention is achieved through the following measures: this water flow power generation apparatus comprises bracket, water wheels, transmission and generator driven by the water wheels; the transmission is used to change and adjust the revolving speed passed on to the generator from the water wheels to meet the working requirements for the generator generating power. Said bracket has at least one, and the bracket includes an upper bracket and a lower bracket; the transmission and the generator are located above the upper bracket, there are at least two reversely direction-rotating water wheels fixed between the upper bracket and the lower bracket, the vanes of the adjacent water wheels are interlaced arranged, and the same end of each water wheel is fixed with some synchromesh gears respectively; a sharp-angled shape rectifier object A is fixed at the water inlet end of the water wheels between the upper bracket and the lower bracket.

Vanes of said water wheels, the energy conversion surface is concaved curve surface, thus making the vanes intercept and make use of more flowing water and make the torque power produced by the energy conversion surface rotating with the stream greater than the resistance produced by the side rotating against the stream (the reverse side of the energy conversion side), so as to make the ends of the vanes rotating with/against the stream at the two sides of the water wheels produce pressure difference, ensuring the two water wheels can rotate inversely normally.

A streamlined shaped rectifier object B is fixed at the water outlet end of the water wheels between the upper bracket and the lower bracket; the rectifier object B can not only support the upper bracket and the lower bracket effectively, but also prevent water flow from forming eddy at the water outlet end of the water wheels, thus making the whole power generation apparatus run unstably, and it can also avoid foreign bodies such as fish and so on gathering at the eddy area and ingulfing into the water wheels, which will affect the working efficiency of the water wheels and lower the power generation efficiency of the whole apparatus.

In order to be applicable for generating power by tide, a sharp-angled shape rectifier object A is fixed at the water outlet end of the water wheels between the upper bracket and the lower bracket; the rectifier object A at the water inlet and outlet ends can make full use of the bimodal current produced by tide to generate power.

When being used to generate power by tide, in order to adapt to the bimodal current of tide, the vanes of said water wheels are straight plate shape or the two surfaces of the vanes of said water wheels are concaved curve surfaces.

When being used to generate power by ocean current, since ocean currents are mainly water flows of upper water in seas and sea water is comparatively deep, in order to improve the stability of the power generation apparatus, air tank is set on both the upper and lower parts of the bracket respectively, the transmission and generator are located in the air tank. The air tank can provide buoyancy force for the power generation apparatus to ensure the stability of the whole power generation apparatus. In order to improve the stability of the whole power generation apparatus, the air tank is of streamlined structure.

To improve the stability of the power generation apparatus operating in ocean current, in this invention, a rudder plate is designed at the tail part of the bracket at the water outlet end.

The two symmetrical broadsides of said sharp-angled shape rectifier object A along the axis are straight lines or concave arc lines. The front water flow direction at the axis part of the sharp-angled end of the rectifier object A changes under the action of the rectifier object A in the structure, making the direction changed water flow and the front water flow at the two sides of the rectifier object A slant impact the energy conversion side(concaved curve surface) of the vanes of the water wheels from each direction, effectively improving the impact force of water flow to the vanes of the water wheels and increasing the pressure difference between the ends with and against the stream of the water wheels, so as to help the two wheels overcome the resistance and rotate inversely to produce torque force, and pass on to the generator through the water wheel axles and transmission to generate power, improving the power generating efficiency effectively.

The bottom margin of the sharp-angled shape rectifier object A is concave arc lines or consists of two symmetrical concave arc lines along the axis; therein the two concave arc lines are correspondent with the two water wheels respectively. Such shape of rectifier object A reserves some space for the water wheels to rotate and can avoid the bottom of the rectifier object A increasing the resistance for the rotating, thus reducing the generating efficiency of the whole power generation apparatus.

According to different working requirements, transmission and generator can be connected to the water wheel axle outlet end of either of the water wheels, thus, the torque force of the two water wheels can be passed on to the transmission through two synchromesh gears, and then passed to the generator to generate power, through the transmission, which is of comparatively high generating efficiency; transmission and generator can also be connected to the water wheel axle outlet ends of both water wheels respectively, thus the torque force of the two water wheels can be passed on to the corresponding transmission through the wheel axles, and then passed to the corresponding generator to generate power through the transmission, which has comparatively high utilization ratio of water power and generating efficiency.

This apparatus has two or more brackets in vertical direction, the generator fixed above the upper bracket in the top bracket, making the whole generating apparatus extends along the vertical direction, so as to make use of water power more effectively and improve the torque force of the water wheels and the generating efficiency exponentially.

This apparatus has two or more brackets in horizontal direction, the generator fixed above the upper bracket in each bracket, making the whole generating apparatus extend along the horizontal direction as required, so as to form a horizontal queue of generating, improving the utilization ratio of water power and generating efficiency effectively.

The bottom margin of the streamlined rectifier object B is concave arc lines or consists of two symmetrical concave arc lines along the axis; therein the two concave arc lines are correspondent with the two water wheels respectively. Such shape of rectifier object B reserves some space for the water wheels to rotate and can avoid the bottom of the rectifier object B increasing the resistance for the rotating, thus reducing the generating efficiency of the whole power generating apparatus.

A concentric location hole is designed on the upper bracket, the rectifier object A and the lower bracket, when installing, the gauge pile passes through the location holes on the upper bracket, the rectifier object A and the lower bracket in succession, thus concatenate the whole generating apparatus; and then the bottom end of the gauge pile is driven into the riverbed to fix the whole generating apparatus.

In order to achieve a better effect of locating and fixing, a concentric location hole is designed on the upper bracket, the rectifier object B and the lower bracket, the gauge pile passes through the location holes on the upper bracket, the rectifier object B and the lower bracket in succession, thus concatenate the whole generating apparatus; and then the bottom end of the gauge pile is driven into the riverbed to fix the whole generating apparatus.

Advantages of this invention can be obtained according to the above description, the apparatus for generating power by water flow has at least one bracket which includes an upper bracket and a lower bracket; a sharp-angled shape rectifier object A is fixed between the upper bracket and the lower bracket at the water inlet end of the water wheels, the rectifier object A, upper bracket and lower bracket form the installation framework, which is used to fix and install the water wheels, and making the whole power generating apparatus floating in water stably or firmly fix it in water by traction fixing part. The transmission and the generator are located above the upper bracket, and at least two reverse direction rotating water wheels are fixed between the upper bracket and the lower bracket with the vanes of the adjacent wheels interlaced arranged, and the same end of each water wheel is fixed with some synchromesh gears respectively; the generator is connected with the synchromesh gears and the water wheels through the transmission and the water wheel axles. Since the vanes of the adjacent wheels are interlaced initially, they can reduce the area and resistance of the wheel vanes to meet water flow when rotating against the stream effectively, and increase the pressure difference of the water wheels in both directions with and against the stream; and under the effect of the synchromesh gears, each water wheel can rotate inversely at the same time, and it will not lead to the situation that the vanes of the adjacent wheels crashing and disturbing each other, so as to keep each water wheel working independently at the same time; thus, all the water wheels can work at the same time, and the torque force of each wheel can be passed on to the generator to produce power, which can not only improve the utilization ratio of water power, but also improve the generating efficiency; moreover, the whole generating apparatus is of simple structure, low cost for design and manufacture and easy installation, and applicable to various water flow (such as streams, rivers, oceans and tides and so on); it can work not only when floating on water, but also being fixed in the river (sea) bed by the bottom of the apparatus so as to make it work on water or fully under water. Thus it can be seen that, compared with the existing technology, this invention has outstanding substantial characteristics and prominent progress, with obvious beneficial effect.

1 refers to the upper bracket, 2 refers to the synchromesh gear, 3 refers to the generator, 4 refers to the transmission, 5 refers to the water wheel axle, 6 refers to the rectifier object B, 7 refers to the water wheel, 8 refers to the lower bracket, 9 refers to the rectifier object A, 10 refers to the water wheel, 11 refers to the synchromesh gear, 12 refers to the water wheel axle, 13 refers to the location hole, 14 refers to the location hole, 15 refers to the upper air tank, 16 refers to the lower air tank, 17 refers to the rudder plate and 18 refers to the hole for traction rope.

DESCRIPTION OF THE PREFERRED EMBODIMENTS

In order to describe the technological characteristics of this invention clearly, this invention is described as follows through the embodiments as well as the figures:

Embodiment 1

Figure 1:
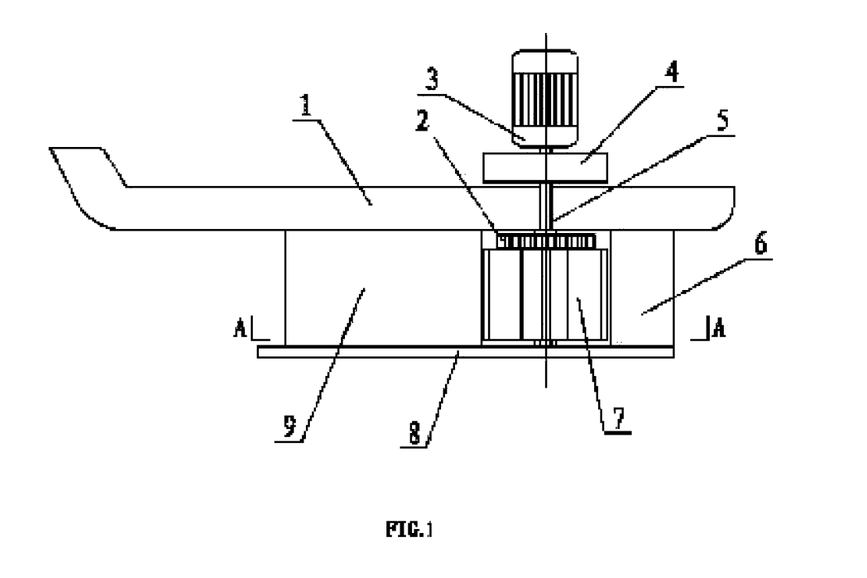
FIG. 1 is the front view structure diagram of the invention embodiment 1.
Figure 2:
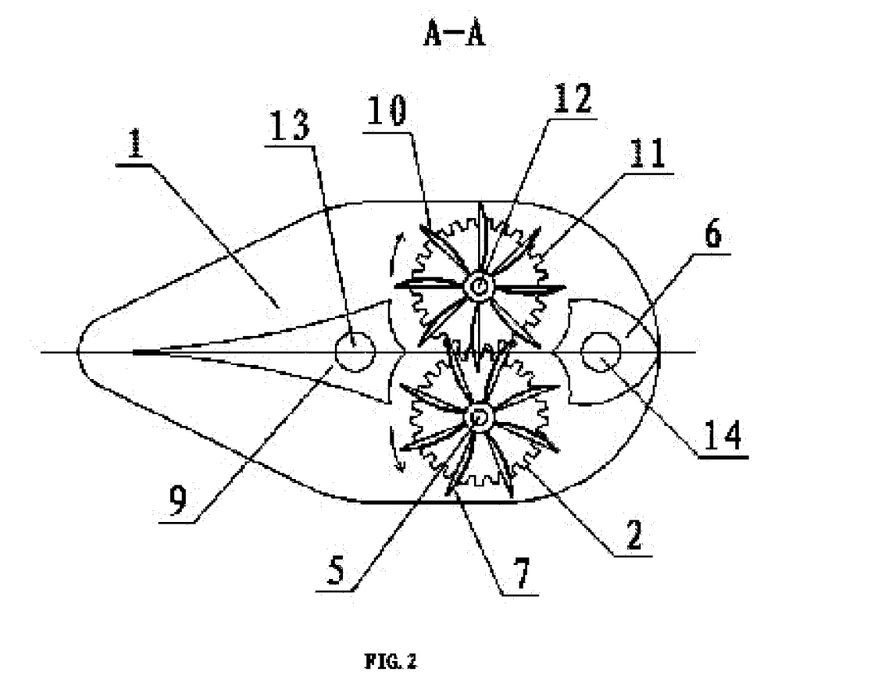
FIG. 2 is the section view diagram of Side A-A in FIG. 1.

A apparatus for generating power by water flow, as shown in FIG. 1 and FIG. 2, consists of the brackets, water wheel 7, water wheel 10 and transmission 4 and generator 3 driven by water wheel 7 and water wheel 10; it has at least one bracket, and the bracket consists of the upper bracket 1 and the lower bracket 8, with transmission 4 and generator 3 located above the upper bracket 1. A sharp-angled shape rectifier object A 9 is fixed between the upper bracket 1 and the lower bracket 8 at the water inlet end of water wheel 7 and water wheel 10; and a streamlined rectifier object B 6 is fixed between the upper bracket 1 and the lower bracket 8 at the water outlet end of water wheel 7 and water wheel 10. The axles of rectifier object A 9 and rectifier object B 6, and the mid-perpendicular of the center of water wheel 7 and water wheel 10 are collinear, and the upper bracket 1, the lower bracket 8, rectifier object A 9 and rectifier object B 6 form the fixed installation framework; the water wheel axle 5 and the water wheel axle 12 are fixed and located by the upper bracket 1 and the lower bracket 8, ensuring the stable operation of water wheel 7 and water wheel 10.

There are at least two reversely direction-rotating water wheels fixed between the upper bracket 1 and the lower bracket 8: water wheel 7 and water wheel 10, the energy conversion surface of each vane of water wheel 7 and water wheel 10 (that is the surface to meet water of the vane rotating with the stream direction) is concaved curved surface, and the vanes of the adjacent water wheel 7 and water wheel 10 are interlaced; the same ends of water wheel 7 and water wheel 10 are fixed with synchromesh gear 2 and pitch gear 11 respectively; and generator 3 is connected with pitch gear 2, pitch gear 11 water wheel 7 and water wheel 10 through transmission 4, water wheel axle 5 and water wheel axle 12; generator 3 can be set by the following two methods: (I) the outlet end of water wheel axle 5 or water wheel axle 12 is connected with transmission 4 and generator 3; (II) both the outlet ends of water wheel axle 5 and water wheel axle 12 are connected with transmission 4 and generator 3 separately.

Therein, the two symmetrical broadsides of the sharp-angled shape rectifier object A 9 along the axis are straight lines or concave arc lines, and the bottom margin is concave arc lines or consists of two symmetrical concave arc lines along the axis. The front water flow direction at the axis part of the sharp-angled end of rectifier object A 9 changes under the action of rectifier object A 9's symmetrical broadsides, so as to make the turnabout water flow and the front water flow at the two sides of rectifier object A 9 slant to impact the concave curved bottom of the vanes of water wheel 7 and water wheel 10; the two symmetrical broadsides of rectifier object A 9 and the concave curved vane structure of water wheel 7 and water wheel 10 can effectively strengthen the impact force of water flow to the vanes of water wheel 7 and water wheel 10, to improve the utilization ratio of water power and the generating efficiency; rectifier object B 6 is streamlined, with the bottom line of concave arc lines or two symmetrical concave arc lines along the axis.

In order to fix the whole power generating apparatus better, a concentric location hole 13 is designed at the water inlet ends of water wheel 7 and water wheel 10, on the upper bracket 1, the rectifier object A 9 and the lower bracket 8; at the water outlet ends of water wheel 7 and water wheel 10, a concentric location hole 14 is designed on the upper bracket 1, the rectifier object B 6 and the lower bracket 8. This structure can realize the fixed position to use one gauge pile through the location holes 13 on the upper bracket 1, rectifier object A 9 and the lower bracket 8 separately in succession along the vertical direction and another gauge pile through the location holes 14 on the upper bracket 1, rectifier object B 6 and the lower bracket 8 in succession along the vertical direction and then drive the bottom ends of the two gauge piles into the river bed so as to concatenate and fix one or more groups of generating apparatus set vertically together. The upper ends of the two gauge piles can be connected with the fixture stake located at the upstream of the generating apparatus by a traction rope, so as to make the whole generating apparatus fixed and positioned better.

Figure 3:
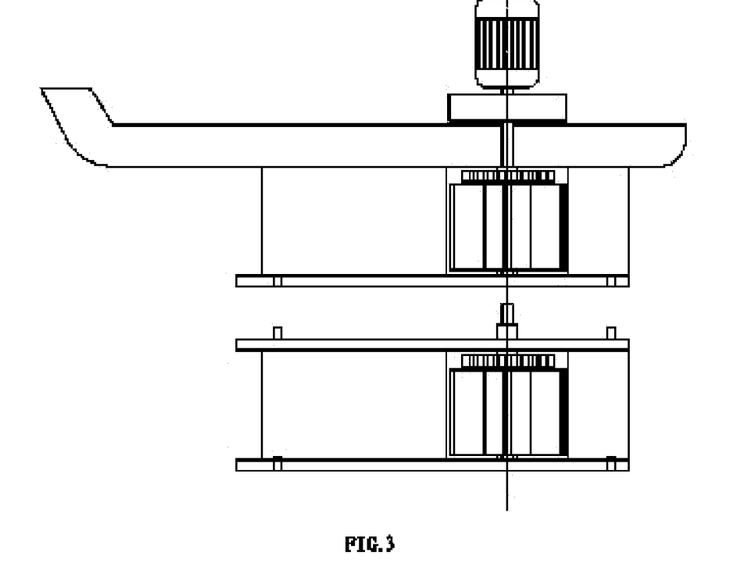
FIG. 3 is the structure diagram of the invention extending along the vertical direction

The whole power generating apparatus can extend vertically or horizontally as required, to form a pectinate and net shaped generating network, so as to make use of water power to the largest extent; a traction meshwork frame is designed at the upstream of the generating network by the underwater fixture stake and anchor chain, to connect with the generating network through the traction rope and the traction meshwork frame which can also ntercept some big floating things in the upstream of the generating network. The generating network can be achieved according to the methods as follows:

(I) In vertical direction: As shown in FIG. 3, two or more brackets are designed in vertical direction, with transmission 4 and generator 3 fixed above the upper bracket 1 in the top bracket and water wheel axle 5 and water wheel 12 extending to the bottom bracket vertically, so as to make the torque force of water wheel 7 and water wheel 10 passed on to transmission 4 through water wheel axle 5 and water wheel 12 and then passed to generator 3 through transmission 4;

(II) in horizontal direction: in the flat or comparatively slightly slant water flow, two or more brackets are designed horizontally, with transmission 4 and generator 3 fixed above the upper bracket 1 in each bracket, forming several paratactic generating apparatus in horizontal direction, to get water flow as more as possible and make use of it to generate power.

This power generating apparatus can be installed by the three methods as follows: (I) operate when floating: a gauge pile is set under water, and connect the power generating apparatus with the fixture stake by a traction rope, making the apparatus operate when floating on water; at this moment, transmission 4 and generator 3 float on water; and rectifier object A and rectifier object B can adopt hollow structure or light materials (such as foam), so as to make the power generating apparatus operate more stably when floating; (II) ground installation: fix the bottom of the power generating apparatus at the river (sea) bed, with transmission 4 and generator 3 operating on water. At this moment, rectifier object A and rectifier object B can adopt solid structure or hollow structure filled with heavy materials (such as sand and so on) to increase the stability of the whole apparatus; (III) operate under water totally: at this moment, waterproofing technology can be achieved with prior technology and it will not be described in detail.

This power generating apparatus can be applied to various occasions: (I) in the flat or comparatively slightly slant water flow, it can adopt any of the fixture and installation methods mentioned above; (II) in the vertical flow (such as waterfalls) and quite slant water flow, the bottom of the power generating apparatus can be fixed and installed on the side wall above the flat water, with traction rope to fix it on the upper part, to keep the apparatus vertical to the direction of water flow; (III) as for the comparatively deep water flow (such as ocean current), it can be installed under water totally.

Embodiment 2

Figure 4:
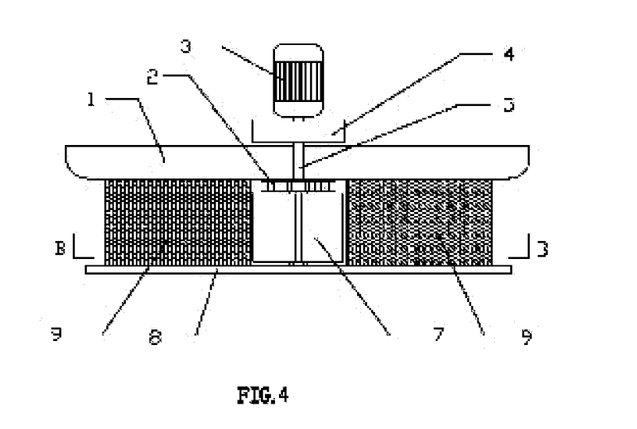
FIG. 4 is the front view structure diagram of the invention embodiment 2.
Figure 5:
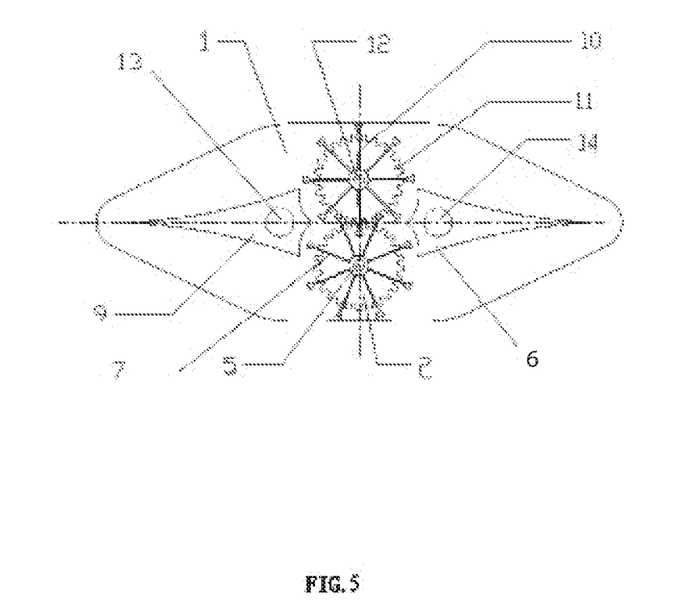
FIG. 5 is the section view diagram of Side B-B in FIG. 4.
Figure 6:
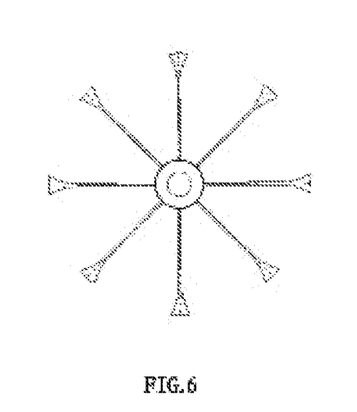
FIG. 6 is the structure diagram of the water wheels in the invention embodiment 2.
Figure 7:
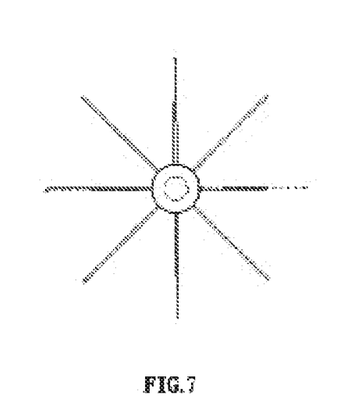
FIG. 7 is the other kind of structure diagram of the water wheels in the invention embodiment 2.

As shown in FIG. 4-5, this embodiment is basically the same as Embodiment 1, the difference is: in this embodiment, a sharp-angled shape rectifier object A 9 is designed at the water outlet ends of water wheel 7 and water wheel 10 between the upper bracket 1 and the lower bracket 8, and the two surfaces of the water wheel vanes in this embodiment are both concave curved surfaces, as shown in FIG. 6; or as shown in FIG. 7, the vanes of water wheel are straight plates shape.

The structure of this embodiment is applicable to generate power by tide. Since tide is the water flow of double directions, the water inlet and outlet ends of the apparatus can adopt the same rectifier object, so as to make full use of the double-direction water flow produced by tide to generate power at quite high efficiency.

The other parts of this embodiment are same as embodiment land will not be described in detail.

Embodiment 3

Figure 8:
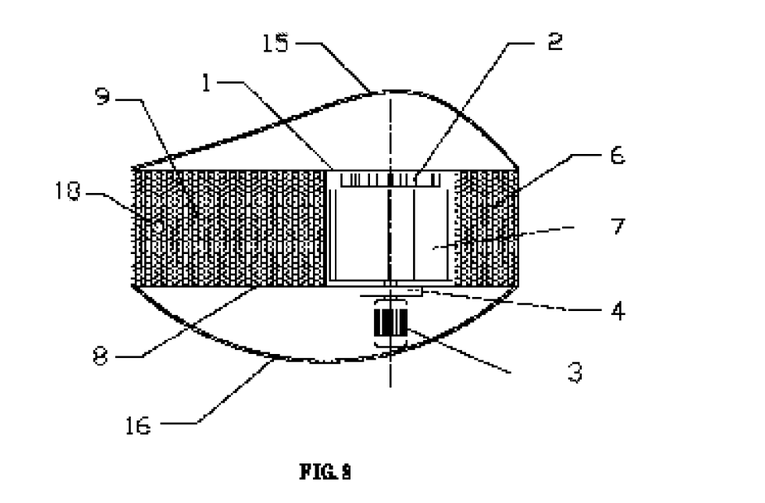
FIG. 8 is the structure diagram of the invention embodiment 3.

As shown in FIG. 8, this embodiment is basically the same as Embodiment 1, the difference is: in this embodiment, an upper air tank 15 is designed on the upper part of the upper bracket 1 and a lower air tank 16 is designed on the lower part of the lower bracket 8, with generator 3 and transmission 4 under the lower bracket 8 in the lower air tank 16; the upper air tank 15 and the lower air tank 16 are both of streamlined structure. In this embodiment, generator 3 and transmission 4 are set at the lower part of the lower bracket 8, which can lower the gravity of the power generating apparatus and ensure the stability of the apparatus. Certainly, in order to facilitate the examination and maintenance, in this embodiment, generator 3 and transmission 4 can also be set on the upper part of the upper bracket 1 in the upper air tank 15.

The structure of this embodiment is applicable to generate power by ocean current. Since when generating power by ocean current, sea water is comparatively deep and mainly flows in the upper part of water, this invention sets air tanks to provide buoyancy force for the power generating apparatus so as to ensure the stability of the whole apparatus. It can be floating or fixed in the sea by cable anchor. When this power generating apparatus is fixed in the sea by cable anchor, set a hole for traction rope 18 at the front end of the power generating apparatus and use a traction rope to fix the apparatus in the sea through the hole 18.

The other parts of this embodiment are same as embodiment 1 and will not be described in detail here.

Embodiment 4

Figure 9:
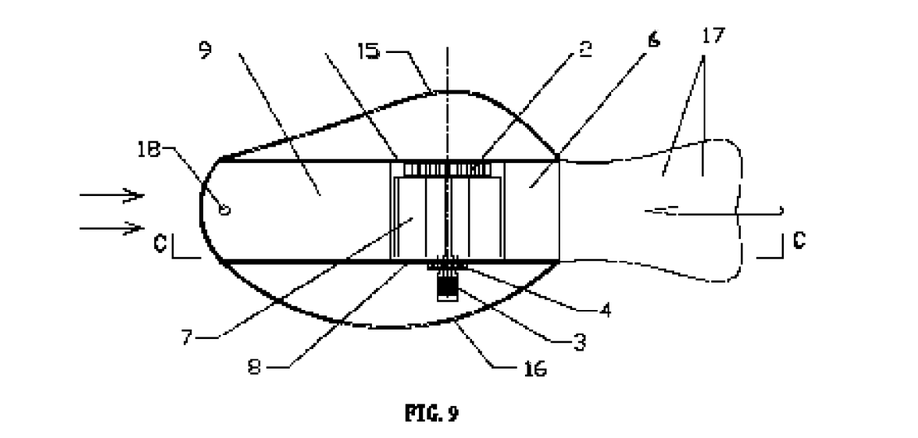
FIG. 9 is the structure diagram of the invention embodiment 3 with rudder plate.
Figure 10:
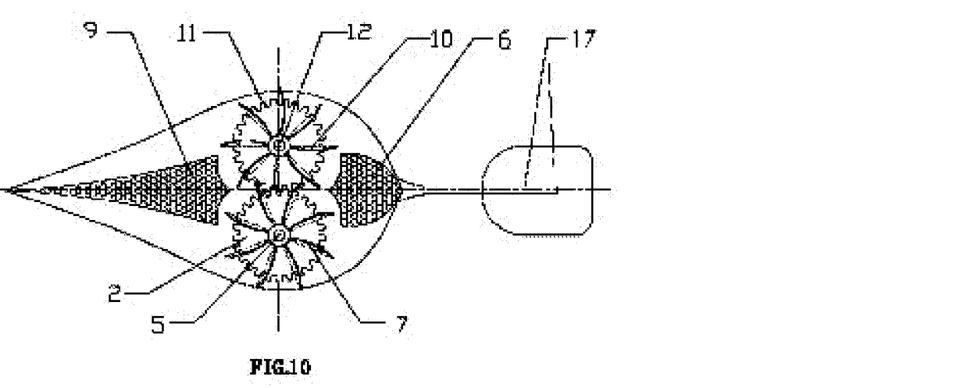
FIG. 10 is the section view diagram of Side C-C in FIG. 9.
Figure 11:
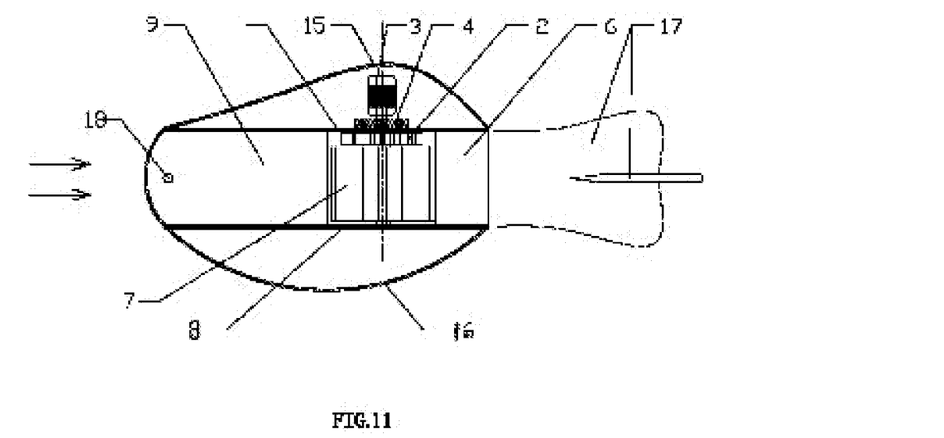
FIG. 11 is the structure diagram of the invention embodiment 3 when the generator and the transmission are located on the upper part.

As shown in FIG. 9-10, this embodiment is basically the same as Embodiment 1, the difference is: in this embodiment, a rudder plate 17 is designed at the tail of the bracket at the water outlet end; the rudder plate 17 is like a fish tail, consists of the horizontal wing panel and vertical wing panel. The designing of the rudder plate 17 can improve the stability of the power generating apparatus when operating in ocean current, so as to ensure the safety and generating efficiency of the apparatus. In this embodiment, generator 3 and transmission 4 can also be set in the upper part of the upper bracket 1 in the upper air tank 15, as shown in FIG. 11.

The other parts of this embodiment are same as embodiment 3 and it will not be described in detail.

This invention is not limited to the above embodiments; all the changes, remodels, additions or replacements made by the ordinary technical personnel in this field within the substantial range of this invention also should belong to the protection range of this invention.

The invention claimed is:

1. A water flow power generation apparatus, comprises bracket, water wheels, transmission and generator driven by the water wheels, wherein: the bracket includes an upper bracket and a lower bracket, the transmission and the generator are located above the upper bracket, there are at least two reverse direction rotating water wheels fixed between the upper bracket and the lower bracket, every vane of one wheel extends into a space between two adjacent vanes of the other wheel, and the same end of each water wheel is fixed with some synchromesh gears, respectively, a sharp-angled shape guide object A is fixed at the water inlet end of the water wheels between the upper bracket and the lower bracket.

2. The water flow power generation apparatus according to claim 1, wherein: vanes of said water wheels, the energy conversion surface is concaved curve surface.

3. The water flow power generation apparatus according to claim 1, wherein: a streamlined shaped guide object B is fixed at the water outlet end of the water wheels between the upper bracket and the lower bracket.

4. The water flow power generation apparatus according to claim 3, wherein: the bottom margin of the streamlined guide object B is concave arc lines or consists of two symmetrical concave arc lines along the axis.

5. The water flow power generation apparatus according to claim 3, wherein: a concentric location hole is designed on the upper bracket, the guide object B and the lower bracket.

6. The water flow power generation apparatus according to claim 1, wherein: a sharp-angled shape guide object B, the same shape as the guide object A, is fixed at the water outlet end of the water wheels between the upper bracket and the lower bracket.

7. The water flow power generation apparatus according to claim 6, wherein: the vanes of said water wheels are straight plate shape or the two surfaces of the vanes of said water wheels are concaved curve surfaces.

8. The water flow power generation apparatus according to claim 1, wherein: air tank is set on both the upper and lower parts of the bracket respectively, the transmission and generator are located in the air tank.

9. The water flow power generation apparatus according to claim 8, wherein: the air tank is of streamlined shape structure.

10. The water flow power generation apparatus according to claim 8, wherein: a rudder plate is designed at the tail part of the bracket at the water outlet end.

11. The water flow power generation apparatus according to claim 1, wherein: the two symmetrical broadsides of said sharp-angled shape guide object A along the axis are straight lines or concave arc lines.

12. The water flow power generation apparatus according to claim 11, wherein: the bottom margin of the sharp-angled shape guide object A is concave arc lines or consists of two symmetrical concave arc lines along the axis.

13. The water flow power generation apparatus according to claim 1, wherein: transmission and generator are connected to the water wheel axle outlet end of either of the water wheels.

14. The water flow power generation apparatus according to claim 1, wherein: transmission and generator are connected to the water wheel axle outlet ends of both water wheels respectively.

15. The water flow power generation apparatus according to claim 1, wherein: said apparatus has two or more brackets in vertical direction, the generator is fixed above the upper bracket in the top bracket.

16. The water flow power generation apparatus according to claim 1, wherein: said apparatus has two or more brackets in horizontal direction, the generator is fixed above the upper bracket in each bracket.

17. The water flow power generation apparatus according claim 1, wherein: a concentric location hole is designed on the upper bracket, the guide object A and the lower bracket.

* * * * *